United States Patent [19]

Duffy

[11] Patent Number: 5,270,705
[45] Date of Patent: Dec. 14, 1993

[54] TELEMETRY DATA WORD SELECTOR AND PROCESSOR

[75] Inventor: Harold A. Duffy, Inyokern, Calif.

[73] Assignee: The United States of America as represented by the Secretary of the Navy, Washington, D.C.

[21] Appl. No.: 764,556

[22] Filed: Sep. 20, 1991

[51] Int. Cl.⁵ .............................................. G06F 7/04
[52] U.S. Cl. ....................... 340/870.13; 340/870.01; 340/870.11; 340/825.52; 342/195; 364/424.04
[58] Field of Search ...................... 340/870.01, 870.11, 340/870.13, 825.54, 825.52; 370/94.1, 105.1; 342/50, 44, 29, 36, 190, 195; 364/424.01, 424.04, 424.06, 439, 481

[56] References Cited

U.S. PATENT DOCUMENTS

H241  3/1987  Duffy ............................. 340/825.3

OTHER PUBLICATIONS

"EMR 8350 Digital Analog Converter Maintenance Manual"; Fairchild Weston Systems Inc., Data Systems Division, Sarasota, Fla.; 1987; pp. 1-1 through 1-4, 4-1 through 4-8, 4-36 through 4-46, and 4-59 through 4-79.

Primary Examiner—Donald J. Yusko
Assistant Examiner—Michael Horabik
Attorney, Agent, or Firm—Stephen J. Church; Melvin J. Sliwka; John L. Forrest, Jr.

[57] ABSTRACT

A telemetry word selector and processor device having several digital-to-analog converters (DAC's) receives successive data words each accompanied by a tag word identifying a parameter set in the data word. The device has a tag memory storing, for each possible tag word, a DAC select word having a bit for each DAC and has a bit map memory storing for each DAC a word having a field for each DAC input bit. Each field can address any bit of a data word and has a control bit determining whether the bit is to be unchanged, zeroed, or inverted. The tag memory is addressed by the tag word to output the corresponding word to select DAC's to receive data. The map memory words are output successively, and each field selects a data word bit, as affected by the control bit, for a DAC input word. This word is output to the DAC corresponding to each map memory word if the DAC is selected by the addressed tag memory word. The tag memory thus selects DAC's to receive predetermined data word parameter sets; and, for each DAC, any parameter in a set may be arbitrarily unpacked, scaled, or ignored as determined by the map memory. The parameter set and bit processing for one DAC may be changed, without affecting any other DAC, by reprogramming the memories.

12 Claims, 7 Drawing Sheets

TELEMETRY DATA WORD SELECTOR AND PROCESSOR

BACKGROUND OF THE INVENTION

1. Field of the Invention

The present invention pertains to the field of electrical communications, more particularly the field of continuous variable indication or telemetering, and to the field of electrical computers and data processing systems, more particularly the field of measuring, or monitoring systems having programmed testing conditions.

2. Description of the Related Art

In a conventional telemetry system, serial digital data, which represents periodically sampled measurements of a number of parameters or variables being measured during a test, is received on a carrier frequency in successive, synchronous frames. Typically, the data is displayed in real time on strip chart recorders. Usually different subjects, such as different aircraft, are involved in a testing project. Each subject typically has a different telemetry frequency, and the subjects may use different forms of modulation and multiplexing. Each frame has a synchronization word followed by a predetermined number of data words which may be arranged in a predetermined sequence of the parameters with each word representing one sample of one of the parameters. However, in "supercommutation" several words in a frame may represent the same parameter and in "subcommutation" the same word position in successive frames may represent different parameters. Data for several parameters may be packed in one word. Individual bits in a word may each represent a "discrete" parameter, and several such bits may be displayed as a single parameter. Data from several telemetry frequencies may be directed to the same display. Each frame is "decommutated" into successive parallel data words corresponding to the data words of the frame and is accompanied by strobe signals identifying the presence of a frame and each word.

Conventionally, a demultiplexer, which typically includes several digital to analog converters (DAC's) each driving a pen of a strip chart recorder, directs the successive parallel words corresponding to a selected parameter to a predetermined one of the DAC's. The direction of parameters to particular DAC's is determined by patch panel wiring which selects the proper data words by their position in their respective frames. For scaling and number conversion, a conventional demultiplexer has patch panel wiring allowing any bit of a parallel data word to be directed to any input bit of a DAC. Such a patch panel provides for changing the DAC receiving a parameter and for changing the scaling of a parameter while data is being received without affecting the display and recording of data for any other parameter. Since patch panel wiring is complex and error prone, it is usual to maintain a "library" of wired patch panels for parameters common to different projects; however, the cost and space of such a library is highly disadvantageous.

Such a conventional telemetry system does not have the ability to handle later developments in telemetry formats. For example, the location of parameters within a frame may be more complex than in supercommutation and subcommutation as described above. Also, data for a set of parameters may be received asynchronously and be identified by predetermined identifier word appearing in a frame having data for the set.

As a result, telemetry preprocessors have been developed to sort out and scale data received from various sources and received at irregular intervals. As data is received at rates of up to several million words per second, a preprocessor sorts out each parameter and outputs, asynchronously and in parallel format, a word with the corresponding data together with a tag word identifying the data and with a strobe signal. The output data word identified by a tag word may be packed with multiple bit or discrete data representing several parameters. A telemetry preprocessor includes several digital processors and controllers having stored tables which are programmed by a separate, host computer and which control the sorting and scaling of input data and specify the tags and destinations of output data for display. Typically, each class of subjects involved in a telemetered test project uses similar such tables so that the tables for decommutation and demultiplexing the input data of a telemetry project may be largely programmed from existing tables. However, the tables related to the output data must be arranged for the parameters of interest in a particular project. Although the preprocessor tables provide great flexibility in parameter selection and are easily stored, these tables are so complex that they cannot be easily changed to vary the tags, scaling, and data destination. In any event, several minutes are required to load the preprocessor tables from a host computer, and data cannot be displayed during table loading. As a result, desirable changes in parameter selection, scaling, and display destination are not practical during a test using a telemetry preprocessor.

The present applicant's United States Statutory Invention Registration (SIR) H241 published Mar. 3, 1987 discloses a telemetry word selector used with a data compressor which, like an above-described preprocessor, receives telemetry data from several decommutators, sorts out parameters, and asynchronously and sequentially outputs parallel data words each with a tag word identifying the source of the data. Such a compressor is also like a preprocessor in requiring complex programming and being unsuited to changes during a test. The selector of SIR H241 has eight DAC's corresponding to the usual number of pens in a strip chart recorder. This selector has a memory storing tags and scaling codes individually associated with the DAC's, and each DAC and the corresponding tag are addressed by the same address counter. As this selector receives each tag word, the address counter is initiated to scan the memory for a matching tag. If a match is found, the data word, after scaling, shifting, and conversion controlled by the corresponding code, is directed to the DAC addressed by the counter. It is evident that this selector cannot direct one or more parameters in a data word to different DAC's. This selector has a panel with a display and a keyboard for entering the tags and conversion codes for several telemetry projects.

It is usual to record serial telemetry data for later analysis where parameters can be unpacked, scaled, and otherwise manipulated. However, this is irrelevant during a test where telemetered data must be observable to detect events requiring changes in the operation of subjects involved in the test; to better display parameters which become of particular interest; to combine displays of parameters; and to correct the display of parameters which are improperly scaled, directed, or unpacked.

These complexities exist because heretofore each received sample of every parameter was not simply "broadcast" with a tag—which typically need not be changed between projects—for different projects by assigning DAC's to receive suitably unpacked and scaled data selected by tag and by using arrangements that allow altering DAC selection and scaling for any parameter during a test without affecting data display for other parameters.

SUMMARY OF THE INVENTION

A telemetry data word selector and processor device receives successive data words each accompanied by a tag word. Each data word has values for one set of a plurality of predetermined sets of telemetered parameters and each set is identified by an arbitrarily assignable tag in the tag word. The device has several digital-to-analog converters (DAC's) each having an input word with a plurality of bits. Any one or more of the DAC's is arbitrarily assignable to one of the parameter sets.

The device has a tag memory addressable by the tags and storing, for each possible tag, a DAC select word having a bit for each DAC. The device also has a bit map memory storing a map word for each DAC. Each map word has a plurality of fields each corresponding to one bit of a DAC input bit and capable of addressing any bit of a data word. Each map word field also has a control bit determining whether the addressed data bit is to be unchanged, zeroed, or inverted. When the device receives each data word and tag word, the tag word addresses the tag memory which outputs the corresponding DAC select word which determines a set of the DAC's to receive data for the parameter set of the data word. As the tag memory is addressed, the device outputs the map memory words successively. As each map memory word is output, the field of this word corresponding to each DAC input bit selects a bit of the current data word for the DAC input and transmits this data bit, as affected by the control bit, to a DAC input latch. The latch contents are then output to the DAC corresponding to the map memory word if this DAC is selected by the tag memory word being addressed by the current tag word.

The DAC's are thus selected by the tag memory to receive predetermined data word parameter sets; and, for each DAC, each parameter in a set may be arbitrarily unpacked, scaled, or ignored as selected by the map memory word corresponding to the DAC. As a result and for each DAC, the parameter set and/or the bit selection may be changed during a test by reloading the tag memory and/or map memory without affecting data being received or displayed through any other DAC. Such reloading, as well as the initial complete loading of the tag and bit map memories for a project, are carried out by a micro computer system incorporated in the device.

An object of the present invention is to provide a telemetry system receiving data at a rate in the order of one million parameters per second wherein the selection and conversion of displayed data for a test may be changed conveniently, both in setting up a test project and during a test, and may be changed during a test for selected parameters without affecting the reception of other parameters.

Another object is to provide such a system wherein instrumentation in test subjects and receiving devices such as decommutators, multiplexers, preprocessors, and the like need not be significantly modified, as by patch panel rewiring or reprogramming, for different test projects.

Still another object is to provide such a system which is fully effective, uses existing preprocessors and the like, and wherein the selection and conversion of data for a particular display may be readily and conveniently changed during a test without affecting data being displayed on other displays.

BRIEF DESCRIPTION OF THE DRAWINGS

Other objects, advantages, and novel features of the present invention will become apparent from the following detailed description when considered with the accompanying drawings in which.

DETAILED DESCRIPTION

Figure 1A:
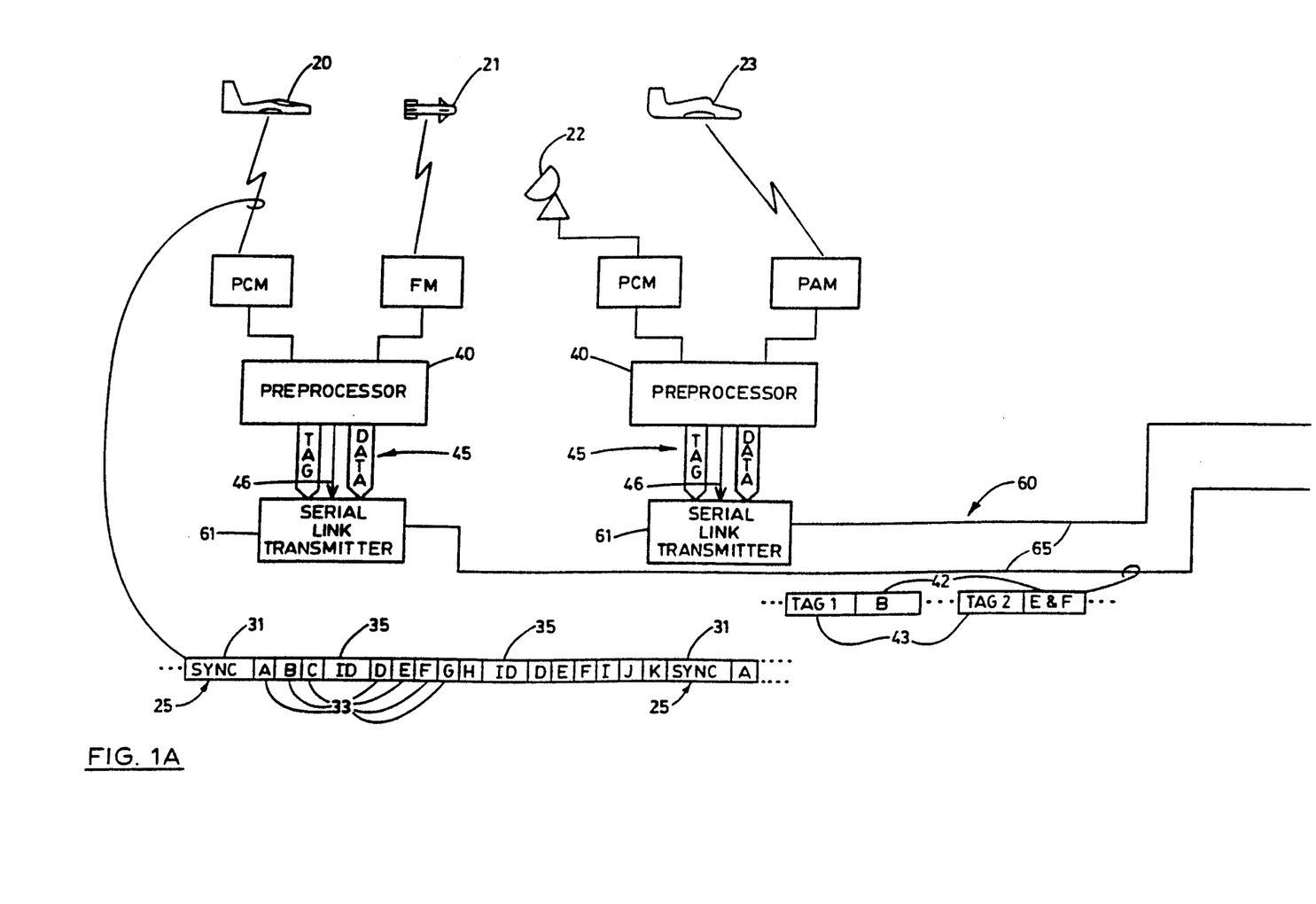
FIGS. 1A and 1B are a diagram of a telemetry system including word selector and processor devices embodying the present invention.
Figure 1B:
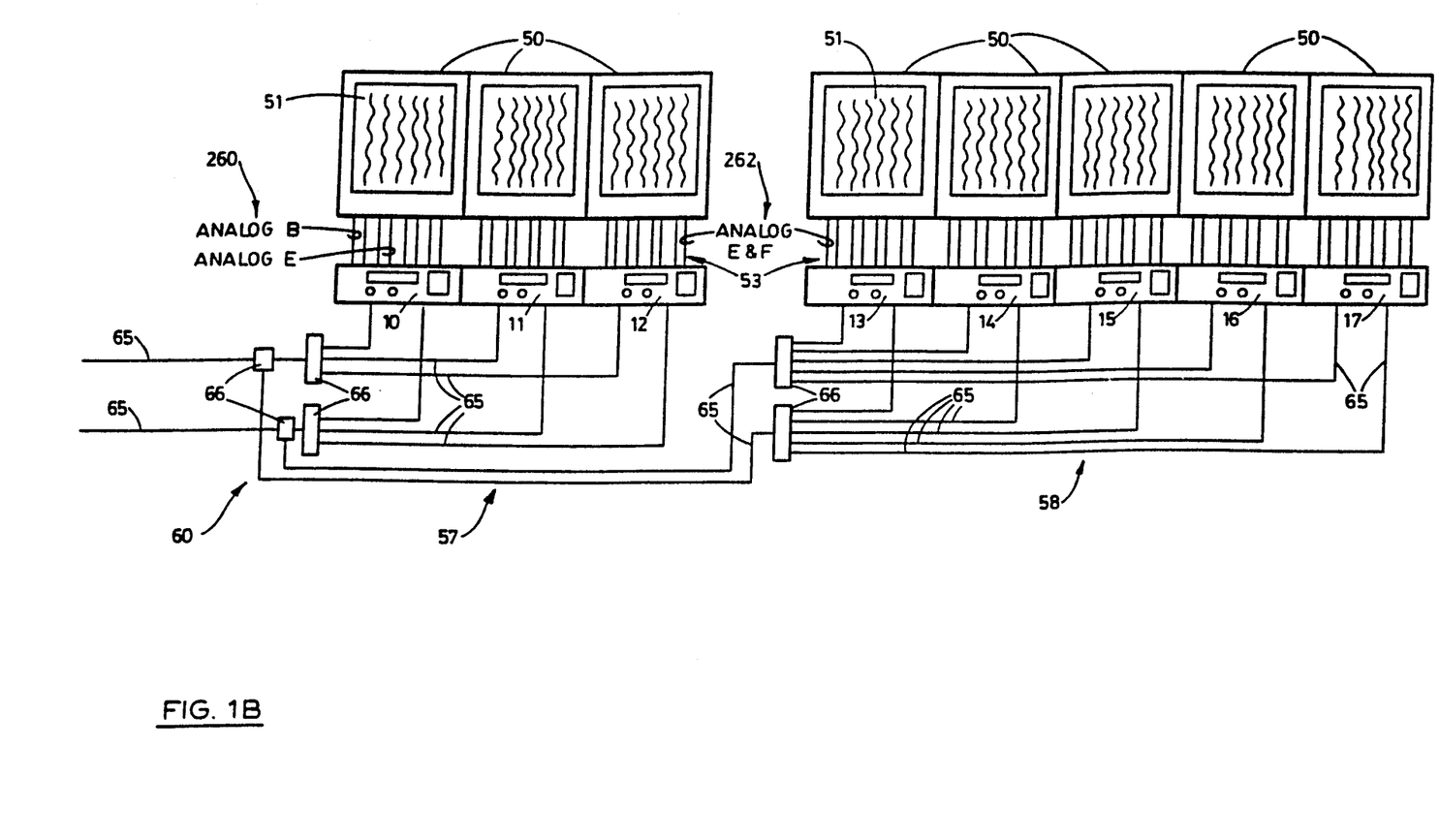
Figure 2A:
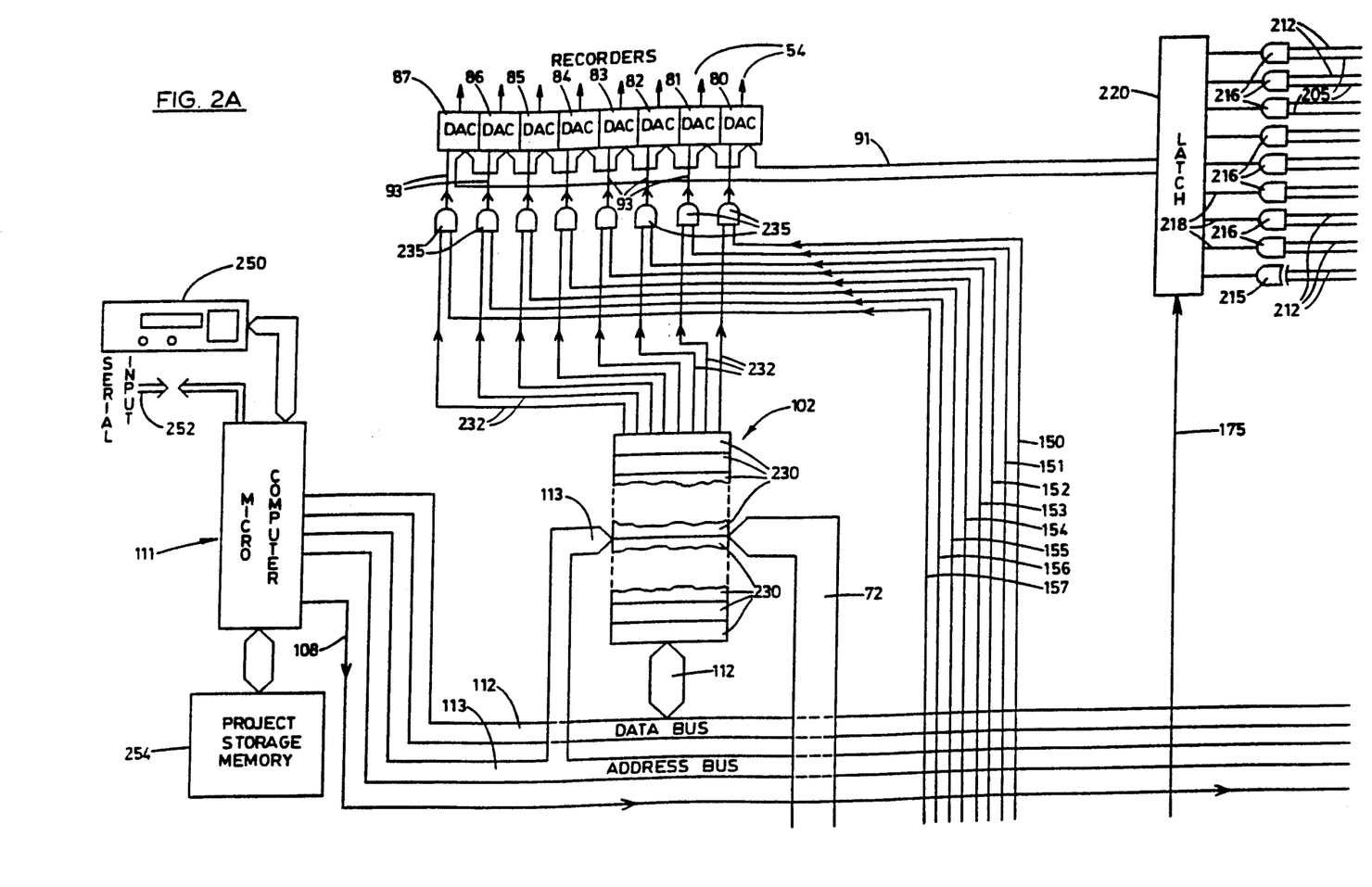
FIGS. 2A-2D are a block diagram of one of the selector and processor devices of FIG. 1.
Figure 2B:
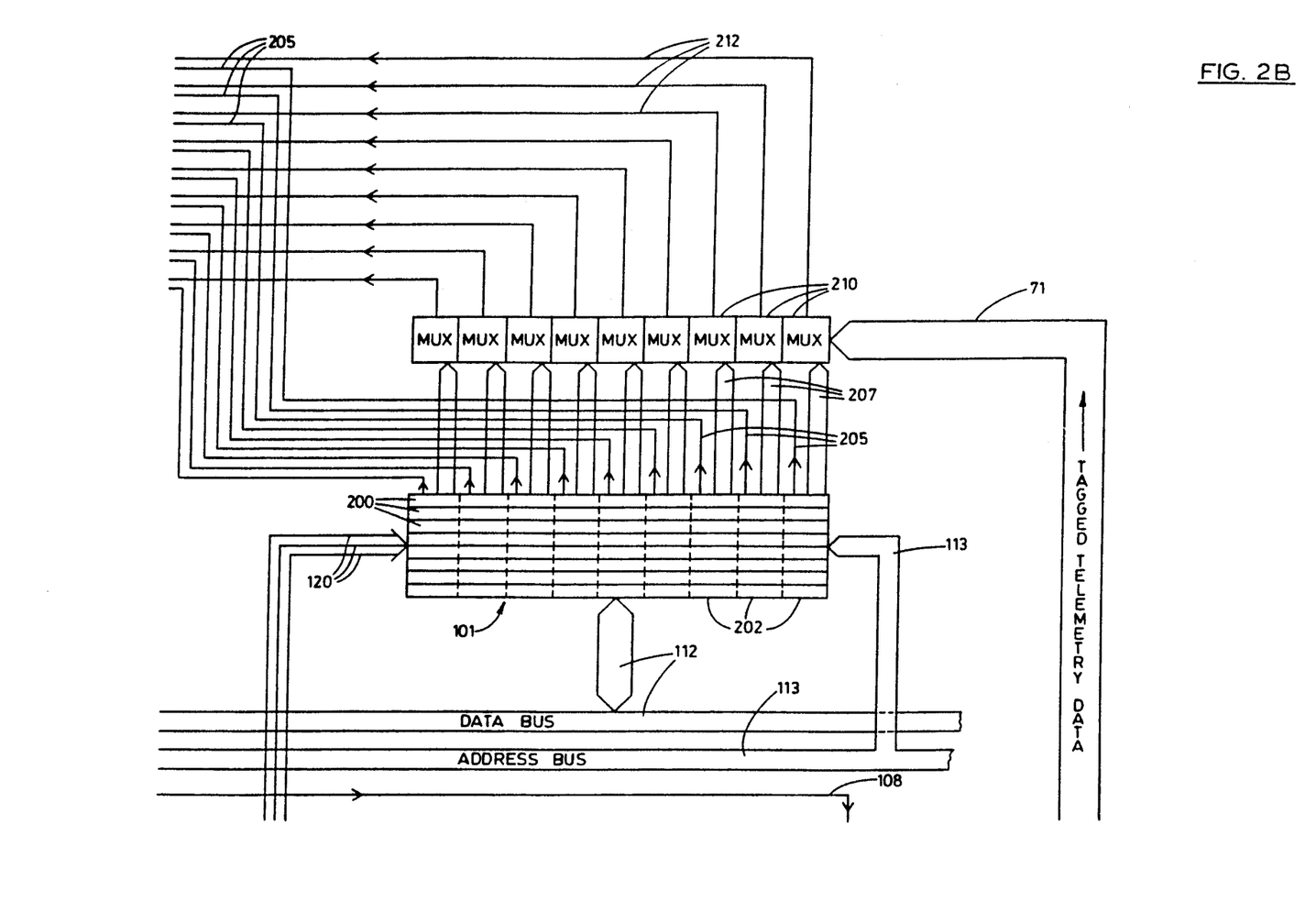
Figure 2C:
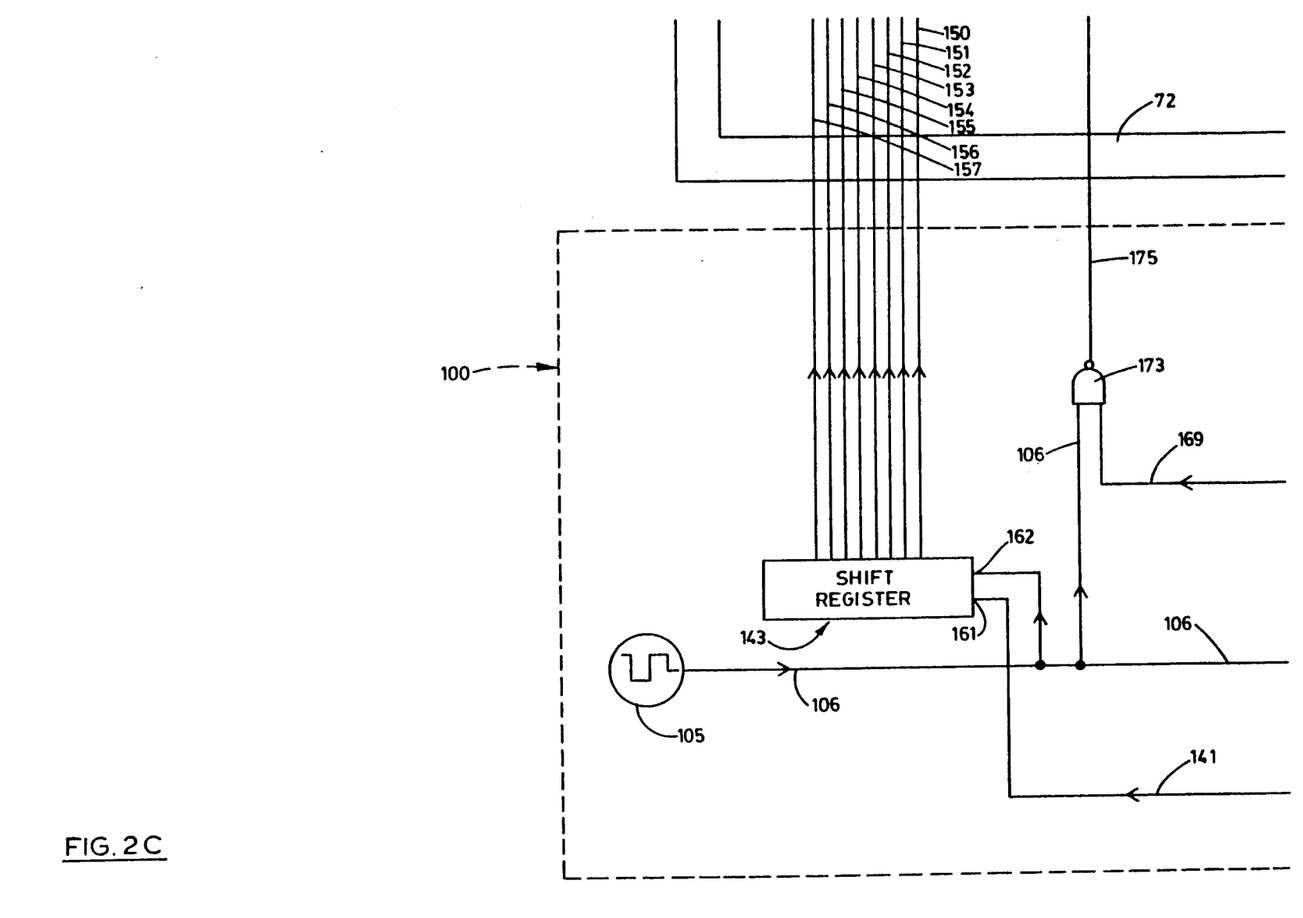
Figure 2D:
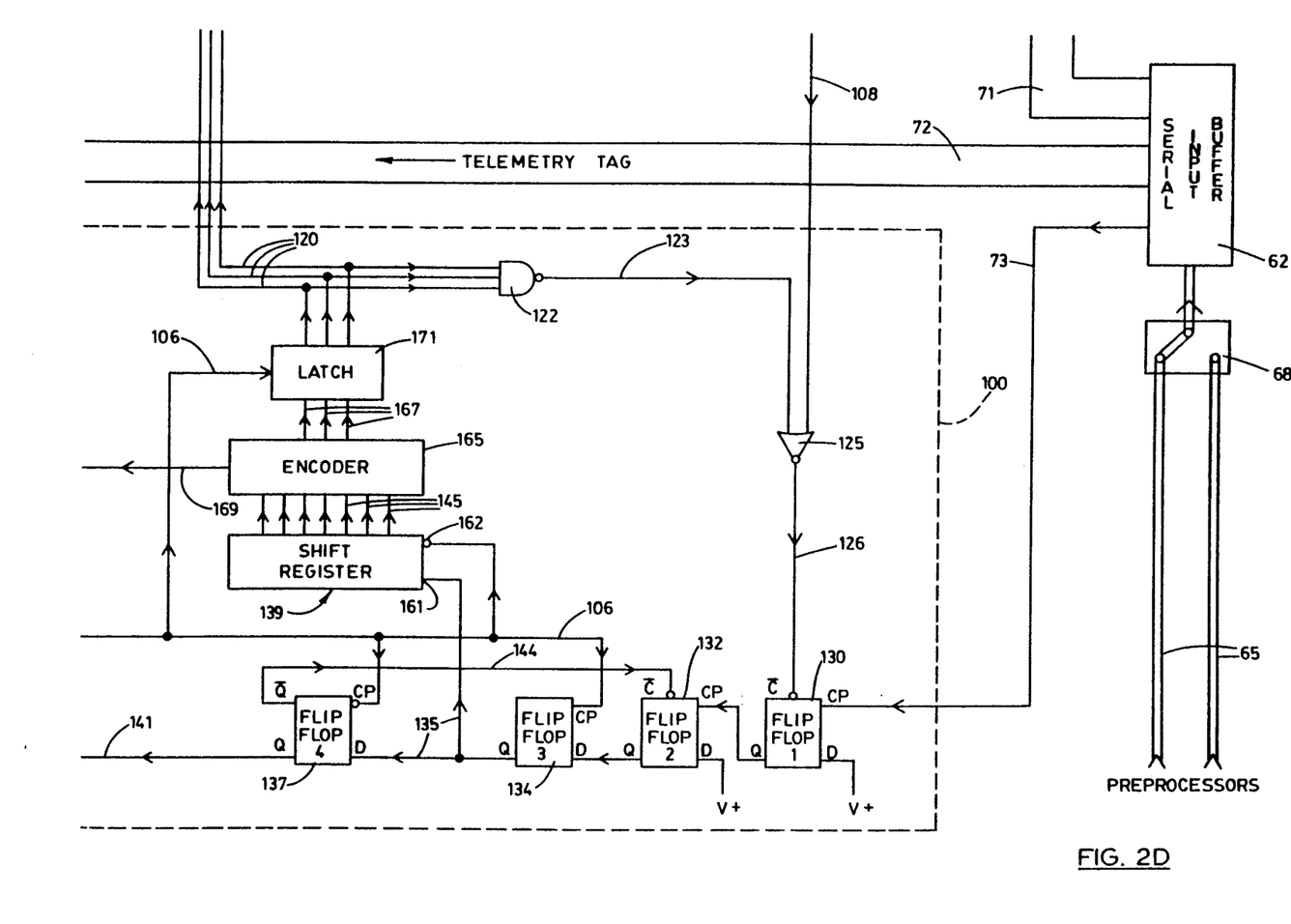

FIG. 1 shows a suppositional telemetry system which is an operating environment for eight telemetry word processor and selector devices 10-17 constructed in accordance with the present invention and used with a method thereof.

The system includes or is used with well-known apparatus and data formats including four test subjects 20-23 transmitting telemetered data by pulse code (PCM), frequency (FM), and pulse amplitude (PAM) modulation. Data from subject 20 is shown in a typical format having a succession of telemetered digital frames 25 each consisting of a "sync" word 31 followed by telemetered data words 33 and carrying current values for parameters, a term used interchangeably herein with "variables", related to operation of the subjects. The parameters and data, such as those identified by the letters "A, B, C, I, J, and K", are identified by their predetermined arrangement in each frame. Other variables, such as those identified by letters "D, E, and F" are further identified in a frame by a preceding identifier word 35. The data for each parameter is in a predetermined binary format such as two's complement. It is to be understood that data and frame arrangements used in an actual test project where data is telemetered are typically much more complex than those represented in FIG. 1.

In the FIG. 1 system, successive frames 25 are presented to one of a pair of well-known and above-mentioned preprocessors 40 which sort out the parameters into digital data words 42 having predetermined bit positions. Preprocessors sold by Fairchild Weston Systems Inc. and identified as the "EMR 8715" preprocessor provide successive words 42 at a rate approaching one million per second and are believed fully effective in the practice of the present invention. Words 42 are sometimes referred to herein as "broadcast data words" for reasons subsequently explained and are also referred to, in connection with devices 10-17, as "telemetry words" or "telemetered data words" since words 42 are provided to the devices by other portions of the telemetry system. A preprocessor provides a broadcast digital tag word 43 substantially simultaneously with and accompanying each word 42, the tag word having a predetermined and arbitrarily selectable digital tag identifying the parameter or parameters in the corresponding word 42. For example, FIG. 1 shows a tag word with a "TAG1" indicating a data word with the above-mentioned parameter "B" and a tag word with a "TAG2" indicating a data word with parameters "E" and "F". Since a preprocessor may receive telemetered data at different rates from several of the subjects 20-23 and since parameters identified by identifier words 35 arrive at undefined times, it is evident that pairs of the words 42 and 43 are successively generated asynchronously by the preprocessors. As indicated by numeral 45, a preprocessor 40 provides each asynchronous data word 42 and tag word 43 pair in parallel format at times identified by a strobe signal indicated by an arrow 46.

Typically for each kind of test subject, such as a particular type of aircraft 20 or 23, the positions of different test parameters in a frame or the particular identifiers are fixed by telemetry instrumentation or by a standard data bus of the subject. Each preprocessor has internal processors and tables for demultiplexing frames and recognizing identifier words and for sorting data of received test parameters into predetermined sets or one or more of the parameters for inclusion in a word 42 and associated with a word 43 tag identifying the set. The broadcast words 42 thus have data for a plurality of broadcast parameter sets which include data for a predetermined set of the test parameters with each word 42 having data for one of the broadcast sets and the data for each parameter in a word 42 being at predetermined broadcast bit positions therein. It is apparent that each tag word contains one tag of a predetermined set of the tags identifying the parameter sets. Typically, each broadcast parameter set includes related parameters, such as acceleration in different directions or a number of discrete parameters, which it may be desired, as in different test projects, to display separately, or together, or both separately and together on different displays with the scaling of a displayed parameter varied at different times or in different projects. Since these variations are limitless and cannot be known in advance of for future test projects, the data for each parameter in words 42 is, typically, left substantially in a predetermined source binary format in which the data was provided to the preprocessor although a preprocessor 40 may perform scaling and other data conversions.

The system of FIG. 1 has eight displays 50 represented as conventional strip chart recorders and individually associated with the word selector and processor devices 10-17 which, typically, are substantially identical. Each recorder has the usual eight channels identified collectively in FIG. 1 by the numeral 51. These channels are devices having individual analog data connections, indicated collectively in FIG. 1 by the numeral 53 and individually in FIG. 2 by the numeral 54, to the corresponding one of the devices 10-17. These channels are individually associated with a plurality of destinations, subsequently described in detail and included in the devices 10-17, for receiving data processed by the devices. The system, by use of devices 10-17, is adapted to select predetermined said destinations, and thus the corresponding channels of the displays 50, to receive destination data derived from words 42 and to select from these words predetermined parameters for each selected destination with different destinations and parameters and destinations being selectable for different test projects without substantially changing the typically complex and difficult to program tables controlling the above-mentioned processors internal of the preprocessors 40. The system has three of the displays at one location or station 57 and five of the displays at another location 58. It is to be understood that the number of displays, their representation as strip chart recorders, their having eight channels, and the number at each location are for purposes of example only since the present invention is believed fully effective, as will be subsequently apparent, with other output devices than strip chart recorder channels with other numbers of channels for each display, other numbers of stations, and other numbers of displays at each station.

The successive and asynchronous parallel words 42 and 43 and strobe signal 46 from each preprocessor 40 are provided to any suitable data link system, indicated in FIG. 1 by numeral 60. System 60 transmits, and thereby broadcasts, these words to each of the word selector and processor devices 10-17. Such a system transmitting data serially and using transmitters an receivers sold under the registered trademark "TAXIchip" by Advanced Micro Devices Inc. is believed effective for this purpose and includes a serial link transmitter 61, associated with each preprocessor 40 as shown in FIG. 1, and a serial data buffer or receiver 62 included in each of the devices as shown in FIG. 2. Each transmitter is connected to each buffer by a branching arrangement of serial transmission lines 65 wherein branching is provided by intermediate buffers indicated by numeral 66. As best seen in FIG. 1 at device 17 and in FIG. 2, 2 each device 10-17 typically receives a line 65 from each preprocessor and is provided with any suitable switch 68 for connecting buffer 62 to a desired one of the preprocessors 40. In effect this buffer is two buffers individually receiving each data word and the accompanying tag word and providing them to, respectively, a tagged telemetry data bus 71 and a telemetry tag bus 72 when a strobe signal 73 occurs upon reception of these words.

Referring to FIG. 2, which shows in greater detail the construction of one of the word selector and processor devices 10-17, it is seen that each of the analog connections 54 to a channel of a recorder 50 emanates from a corresponding one of eight digital to analog converters (DAC's) 80-87, sometimes referred to simply as "converters", which are the above-mentioned plurality of destinations for receiving data from words 42 after processing by the one of the devices 10-17 including the eight DAC's. The device is characterized by having these destinations, and it is apparent that the eight DAC's are a predetermined set of such destinations corresponding to the one device. A data word 42 and its associated bus 71 have a predetermined number of bit positions, typically sixteen, and sometimes referred to herein as "second bit positions". Similarly, a tag word 43 and its associated bus 72 have a predetermined number of bit positions, typically fifteen. Each DAC 80-87 is of any suitable construction, of which a number are well-known, and is receptive to processed digital data or digital converter input word provided on a bus 91 as subsequently described in detail. This word and bus have derived data generated by other and subsequently described elements of the word selector and processor device from data in one of the above-mentioned source formats as provided at the broadcast bit positions of words 42. Each converter input word has a predetermined number of bit positions, typically nine. Each of these bit positions, which are sometimes referred to herein as "first bit positions", has a broadcast bit. Each DAC accepts a DAC or destination input word from bus 91 when a converter input signal occurs on the one of eight strobe connections 93 individual to the DAC. The input word is assumed to be in a predetermined binary format, typically twos complement and left justified with a most significant bit and eight less significant bits, and each DAC converts the input word into a suitable analog signal for the corresponding recorder channel or other apparatus receiving an output from a word selector and processor device of the present invention such as one of the devices 10–17.

Figure 3:
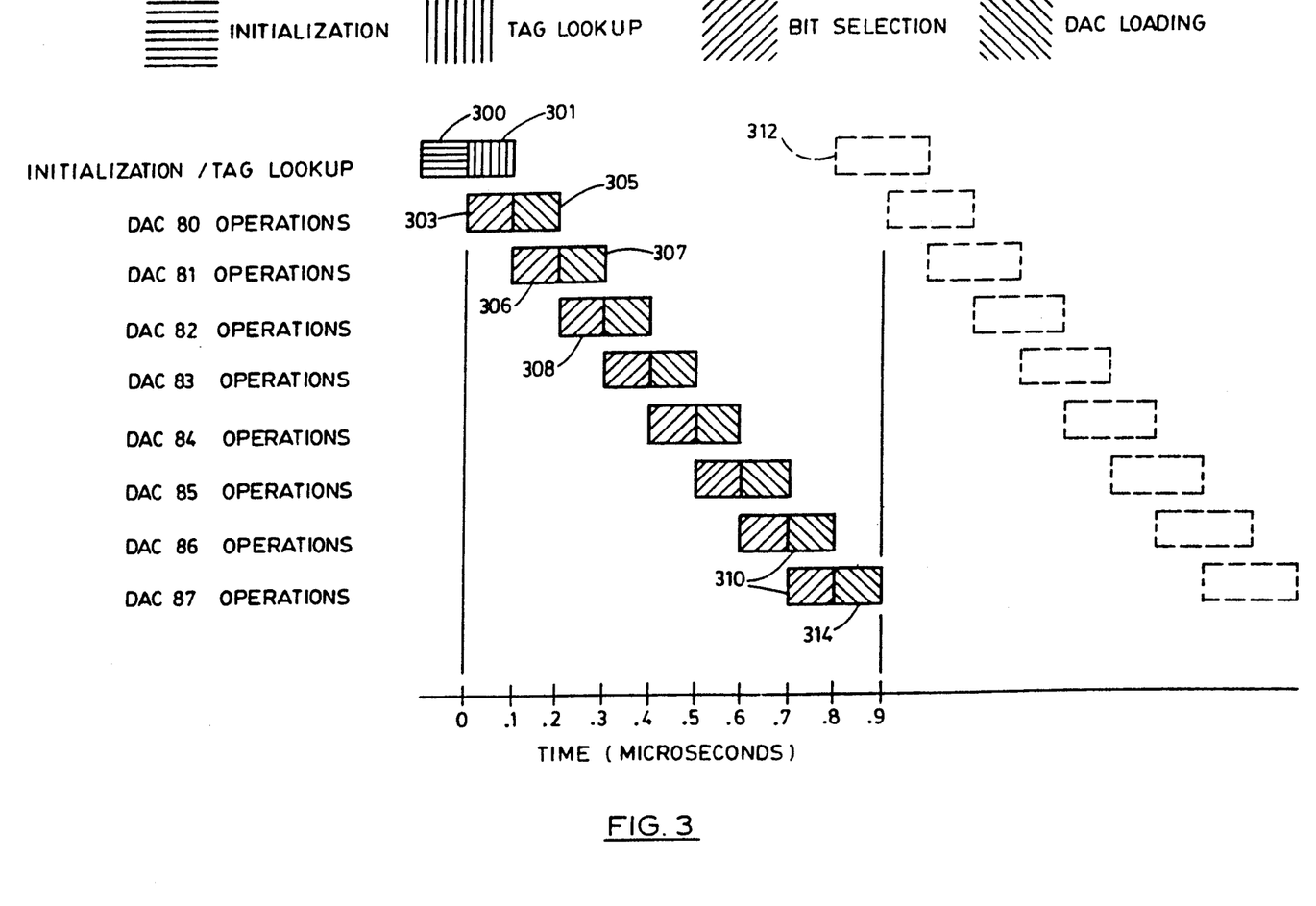
FIG. 3 is timing diagram of data selection and conversion in the device of FIG. 2.

Each device 10–17 is characterized by having a timer 100, which is initiated by strobe signal 73 when a data word 42 and the corresponding tag word 43 are received by the serial input buffer 62. Timer 100 coordinates the processing of data from word 42 in accordance with predetermined information stored in a random access memory (RAM) 101, which is variously termed a bit determination, bit control, or bit mapping memory and which also characterizes the device. The timer further coordinates this processing with direction of the processed data to DAC's 80–87 in accordance with a received tag in word 43 as applied to predetermined information stored in a converter selection or destination selection random access memory 102 which further characterizes the device. The relative timing of these operations as coordinated by timer 100 is shown in FIG. 3.

Timer 100 has a clock 105 providing a 10 MHz squarewave clock signal on a conductor 106 and receives a run/load signal on a conductor 108. As depicted in FIG. 2, the run/load signal is asserted when memory 101 or 102 is to be loaded with the above-mentioned information, in a manner subsequently described, by any suitable microprocessor system 111 of the device. Typically, system 111 provides signal 108 and has a data bus 112, which is adapted to receive and to transmit stored information for memories 101 and 102 and has an address bus 113 adapted to provide addressing for these memories in addition to other and subsequently described addressing for these memories. Timer 100 provides, on three conductors 120, a three bit binary sequence number signal consisting of the binary numbers "000–111" and provided, for reasons subsequently explained, as an address to memory 101. These sequence numbers are generated in succession at the 10 MHz rate of clock 105, and each of the numbers corresponds to one of the DAC's 80–87. A NAND gate 122 is connected to conductors 120 and generates a busy signal on a conductor 123 when any of these numbers than the final number "111" is present. This busy signal and conductor 108 with the run/load signal are provided to a NOR gate 125 which generates a lockout signal on a conductor 126 when timer 100 is not to be initiated by a strobe signal 73.

Timer 100 has a first flip-flop 130. The terminals of flip-flop 130 and the terminals of subsequently described flip-flops are labeled with conventional letter symbols. Flip-flop 130 is connected so as to be set when a strobe signal occurs on conductor 73 and the lockout signal is not present on conductor 126. A second flip-flop 132 is connected so as to be set when flip-flop 130 is set, and a third flip-flop 134 is connected so as to be set when flip-flop 132 is set and the clock signal on conductor 106 rises. When set, flip-flop 134 provides a first signal on a conductor 135 to a fourth flip-flop 137 and to a first shift register 139. When set, flip-flop 137 provides a second signal on a conductor 141 to a second shift register 143 when the first phase signal is asserted and the clock signal falls. Setting of flip-flop 137 results in the resetting of second flip-flop 132 through a conductor 144.

First shift register 139 and second shift register 143 are of well-known construction with each having eight output connections, those of the first register being identified collectively by numeral 145 and those of the second register being identified individually by numerals 150–157. Outputs 150–157 correspond, respectively, to DAC's 80–87 and extend theretoward from timer 100 to provide eight converter selection signals corresponding individually to DAC's 80–87 and thus to the sequence numbers on conductors 120. Registers 139 and 143 each have an input connection 161 whose state is shifted successively into the output connections when a clock signal is provided on a clock connection 162. The first register is clocked by the rise of the clock signal on conductor 106 to input the first signal from flip-flop 134, and the second register is clocked by the fall of this clock signal to input the second signal from flip-flop 137.

Outputs 145 of first register 143 are provided to a well-known encoder 165 which generates, on three conductors 167, a three bit binary number corresponding to the asserted one of the outputs 145. Encoder 165 also generates an output 169 which is asserted when any of the outputs 145 are asserted. The three conductors 167 are provided as inputs to a latch 171 having conductors 120 as output connections. Latch 171 is clocked by the rising clock signal on conductor 106 so as to retain the signals from the encoder as the binary sequence number on conductors 120. Output 169 is provided to a NAND gate 173 which also receives the rising clock signal to generate a latch signal on a conductor 175 extending from timer 100 for a purpose subsequently described.

As a result of the above described elements and connections of timer 100 of a device 10–17, when a data word 42 and tag word 43 are received in serial buffer 62 the corresponding strobe signal on conductor 73 initiates operation of timer 100 by setting first flip-flop 130 unless the device, as indicated by the lockout signal from gate 125 to the first flip-flop, is busy due to loading memory 101 or 102 or to incomplete processing of a previous reception in buffer 62. The strobe signal is retained by second flip-flop 132 for setting of third flip-flop 134 on a rising or first phase of the signal on conductor 106 from clock 105 and setting of fourth flip-flop 137 by a falling or second phase of this signal. Setting of the fourth flip-flop resets the second flip-flop so that the third and fourth flip-flops are each triggered by their respective clock phase to reset after two clock phases. However, during these phases cycle the set outputs of the third and fourth flip-flops insert "one" into, respectively, first shift register 139 and second shift register 143.

Successive occurrences of the phases of clock 105 which loaded the first shift register 139 and the second shift register 143 results in shifting the bit inserted by, respectively, flip-flop 134 and flip-flop 137 and thus successive assertion of signals on each of the outputs 145 and 150–157 with each signal from the first register occurring one clock phase before the corresponding signal from the second register. However, the sequence number provided by encoder 165 is provided to latch 171 and thus to conductors 120 by the clock phase which shifts the second register. As a result, timer 100 provides each sequence number conductors 120 as an above-mentioned DAC selection signal is generated on the corresponding one of the outputs 150-157 from the second shift register. It will be apparent from FIG. 2 that the clock phase following that providing each sequence number and DAC selection signal results in gate 173 generating a latch signal on conductor 175 so that timer 100 generates such a latch signal as, but one clock phase following, each sequence number and corresponding DAC selection signal.

Bit determination memory 101 and related functions and elements will now be described in greater detail. Preferably, this memory is constructed in a well-known manner of bipolar elements to provide the necessary speed for processing data words 42 received at a rate of one million per second with this processing being performed by successively selecting bits from these words for each of the DAC's 80-87. Memory 101 is organized in eight memory locations 200 each addressed by a corresponding one of the sequence numbers provided by timer 100 on conductors 120. Each location 200 thus corresponds to the one of the DAC's 80-87 which corresponds to the same one of the sequence numbers as the DAC. Each location 200 stores a bit determination or mapping word having forty-five bits organized in nine fields 202 of five bits, each field corresponding to one of the above-mentioned nine bits of a DAC input word on bus 91. Each field has a control or determination bit for a purpose subsequently explained. Each field also has a set of four address bits for an address identifying any arbitrarily selectable and predetermined one of the sixteen data bits on bus 71 for selection to derive from the one bit a bit for any one of the nine bits of a DAC input word. Addressing of a word in a location 200 by a sequence number on conductors 120 results in each control bit of the word being provided from memory 101 one of nine conductors 205 corresponding individually to one of the DAC input bits while each of the sets of address bits corresponding to the DAC input bits are provided on one of nine multiplexer address buses 207.

Each device 10-17 has nine multiplexers 210, each multiplexer corresponding to one of the nine DAC input bits on bus 91. Each multiplexer is connected to bus 71 to receive the sixteen data bits thereon and to a corresponding one of the buses 207 and is constructed in a well-known manner so as to provide a bit, which is selected by the above-mentioned four bit address on the one bus 207, to one of nine selected bit conductors 212 which is connected to the multiplexer and which corresponds to the same DAC input bit as the multiplexer.

Each device 10-17 has nine bit control or determination gates 215 and 216. Each gate corresponds to one of the DAC input bits and is connected to the corresponding one of the conductors 212 corresponding to this bit so as to receive for further processing the bit provided on the one conductor by the associated one of the multiplexers 210. Each gate 215 or 216 is also connected to the one of the conductors 205 to receive thereon from memory 101 the control bit from the one of the fields 202 corresponding to the DAC input bit to which the gate corresponds. The gate 215 or 216 then combines, in accordance with a predetermined gate function, this control bit with the bit selected by the corresponding multiplexer 210 to generate, on a one of nine conductors 218 individual to the gates 215 and 216, a processed bit having a condition determined by the gate function.

Typically, each DAC input word has a most significant bit position, which corresponds to a single gate 215 providing the EXCLUSIVE OR function, and has eight less significant bit positions corresponding individually to eight gates 216 providing the AND function. Gate 215 serves, when the corresponding control bit is "one", to derive, for this most significant position and in a well-known manner, a twos complement sign bit from a bit in a predetermined set of data in some other binary format and selected by multiplexers 210 from a word 42. When the control bit to gate 215 is "zero" and when the control bit to each gate 216 is "one", the gate arbitrarily passes on, to the DAC input bit corresponding to the gate, the bit selected by the multiplexer 210 corresponding to the gate. However, when provided with a "zero" control bit, gates 216 arbitrarily set the corresponding DAC input bit to "zero".

Each device 10-17 has a DAC input word latch 220 having nine bit positions. Each of these positions corresponds to one of the bit position of a bus 91 input word for the DAC's 80-87 and to the one of the gates 215 or 216 corresponding to the same DAC input word bit position. Latch 220 is connected to conductor 175, and each bit position of this latch is connected to the corresponding conductor 218 for reception of the bit thereon by the latch when the above-described latch signal is provided on conductor 175 by timer 100. The latch retains an input word formed by the bits processed by multiplexers 210 and gates 215 and 216 for provision of this input word by bus 91 to the DAC's. The bits received by the latch are thus provided to bus 91 for reception by the DAC's.

It is apparent that memory 101, multiplexers 210, gates 215 and 216, latch 220, and bus 91 together with their associated connections serve to select a bit at any one of the bit positions in a data word 42 as provided on bus 71, serve to provide the bit so selected as a processed data bit for any one of the bit positions of an input word for a DAC 80-87, serve to set a bit at one of the later bit positions to a predetermined zero state, and serve to distribute the processed bits generated by the gates to the DAC's. It is further apparent that the multiplexers and gates, which correspond individually to the DAC input bits, serve to insert a bit corresponding to a bit on bus 71 as a bit at any one of the DAC input bit positions.

Destination selection memory 102 and related functions and elements will now be described in greater detail. This memory is organized in 32,768 (32K) memory locations 230 each storing a destination or converter selection word, and each of these words has eight DAC selection bits or indicators individually corresponding to the DAC's 80-87. Memory 102 is addressed via bus 72 by the fifteen bit tag from buffer 62. Since 32K is $2^{15}$ the number of these memory locations is equal to the number of possible tags, and each of the memory locations is addressed by a corresponding one of the possible tags. Memory 102 is of any suitable construction providing a DAC selection word in less than 100 nanoseconds following addressing by bus 72. Addressing of a location 230 by a tag on buffer 72 results in each of the DAC selection bits from the addressed one of the locations 230 being provided on a one of nine conductors 232 corresponding individually to DAC's 80-87.

Each device 10-17 has eight destination control or selection AND gates 235 corresponding individually to DAC's 80-87. Each of these gates receives the one of the conductors 150-157 and the one of the conductors 232 corresponding to the same DAC and provides the above-described converter input signal on the one of the strobe connections 93 corresponding to this DAC. More specifically, each gate 235 provides this input signal only when the associated DAC is selected by the converter selection signal provided by timer 100 on the corresponding conductor 150-157 and when the corresponding DAC selection bit of the DAC selection word being addressed in memory 102 by the tag on bus 72 is in a predetermined state, typically the set state. As a result, data on bus 91, which is retained in a processed data word in latch 220 and is derived from data in a data word 42 received by a device 10-17, is directed to a predetermined set of the DAC's when the word 43 tag accompanying the data word addresses a memory 102 DAC selection word in which DAC selection bits corresponding to the set of DAC's are in the set condition.

It is apparent that bus 91, gates 235, and the above-mentioned feature of each DAC accepting an input word from this bus only when a signal occurs on the corresponding connection 93 serve to receive processed data on latch 220, serve to admit this data to the DAC's as described above, and serve to block this data from the DAC's when the selection bits corresponding thereto are in the reset condition. It is also apparent that, for any predetermined tag from a word 43, the corresponding location 230 in memory 102 may be provided with DAC selection bits to identify an arbitrarily selectable and predetermined set of the DAC's 80-87 which are the only ones of these DAC's to receive data derived from a data word 42 having a predetermined set of telemetered parameters identified by the predetermined tag.

Referring to the microcomputer system 111 of a word selector and processor device 10-17 in greater detail, it is seen from FIG. 2 that system 111 includes a display and keyboard unit 250 for operator control of the system 111 and, thereby, of the entire device. This control may also be exercised remotely, as by a host computer, through a serial input 252. System 111 is adapted, in any suitable manner providing communication between data bus 112 and address bus 113 of the system and memories 101 and 102, to address these memories and to load any desired location 200 of memory 101 with a predetermined bit selection word and to load any location 230 of memory 102 with a predetermined DAC selection word. For one of the devices 10-17, such a predetermined word may be entered on unit 252 during running of a telemetry test project, in which case it is only necessary to stop the operation of the one of the displays 50 associated with the one device for a short period of time while the operation of the other of the devices and their displays is unaffected. However, such words adapting each of the devices for desired operation of the associated display during one or more telemetry projects may be stored in any suitable and nonvolatile project storage memory 254 of system 111 and loaded as a group for one project into memories 101 and 102. It is believed that a variety of microcomputer system elements and programming therefor to provide the above described functions will be apparent to one skilled in the art of microcomputer control arrangements so that specific examples of such elements and programming, which form no portion of the subject invention, need not be further described herein.

The operation of one of the word selector and processor devices 10-17 of the subject invention and a method employing these devices in accordance with the subject invention in a telemetry system, such as the representative telemetry system of FIG. 1, will now be briefly described.

Such a device and method is effective with a plurality of test projects wherein bits at bit positions of the words 42 as provided to bus 71 may be arbitrarily selected and then arbitrarily set to a predetermined state for insertion at predetermined positions of a DAC input word on bus 91 and wherein it is desired to direct the processed DAC input words resulting from such selection and setting to an arbitrary and predetermined set of the DAC's 80-87 as determined by the tag word 43 identifying an arbitrary set of parameters having data in the data word to be directed to the set of DAC's. These functions may be carried out by, first, loading bit selection memory 101, via microcomputer system 111 and at locations 200 corresponding to each of the set of DAC's as determined by the sequence number on conductors 120, with bit selection words having the fields 202 thereof, which correspond by way of one of the multiplexers 210 and bit positions of the latch 220 to the destination bit positions, provided with appropriate addresses for multiplexers 210 and gates 215 and 216. And second, by loading DAC selection memory 102, via system 111 and at locations 230 thereof corresponding to each of said predetermined tags, with DAC selection words having the bits thereof corresponding to each DAC of the set thereof in the set condition.

As a result of so loading memories 101 and 102 and upon initiation of clock 100 when a tag word 43 is received in buffer 62 the following operations occur: First, when each sequence number is generated corresponding to a DAC 80-87 of the set provided to memory 101, the bit determination word stored therein and corresponding to each DAC of the predetermined set is addressed so that the addresses in the fields 202 are provided to the multiplexers 210 to perform the desired selection of bits from the received data word on bus 71, and so that the control bits in the fields are provided to the bit control gates 215 and 216 to perform the desired setting of bits for the input word of the DAC corresponding to the sequence number. Second, when the next latch signal occurs on conductor 175, the bits selected by the multiplexers and set by the gates 215 and 216 are received in latch 220 as the processed word for the DAC corresponding to the sequence number. And third, when the one of the selection signals on a conductor 150-157 corresponding to this DAC occurs, the processed word is directed to that DAC by the gate 235 corresponding thereto if the corresponding bit is set in the memory 102 location 230 being addressed by the tag word received when timer 100 was initiated.

Since any set of the bits in any of the broadcast words 43 of FIG. 1 may be selected as just described, it can be seen that desired data for one parameter, which is included in the set of parameters in the word 43 and is disposed at predetermined broadcast devices 10-17 in any desired set of the bit positions of an input provided on bus 91 of the device to any one or combination of the DAC's 80-87, as in FIG. 1 where parameters "A" and "E" are indicated by numeral 260 as being provided by two different outputs 53 of device 10 to the same one of the recorders 50. Also and as indicated by numeral 262, data for several parameters, such as "E" and "F", may be selected from a data word 43, by several of the devices, such as devices 12 and 13, and combined for provision to a single one of the outputs 53 to the one of the recorders associated with each of the several devices.

FIG. 3 shows the timing of one of the devices 10-17 for initialization and for operation of the DAC's 80-87 in relation to successive 0.1 microsecond cycles of clock 100, each of these cycles corresponding to one of the above mentioned phases of the signal on conductor 106. Upon reception of a data word 42 and a tag word 43 as indicated by a strobe signal 73 and during a first clock cycle as represented by a block indicated by numeral 300, the tag in the word 43 is provided to memory 102. Also during this cycle, binary sequence number "111", which continues to be output on conductors 120 from the processing of a previous data word 42 as will be subsequently apparent, is presented as an address for memory 101. During the following cycle and as indicated by numeral 301, the DAC selection word in memory 102 addressed by the tag is provided to gates 235. Meanwhile, memory 101 outputs the bit selection word at the location 200 corresponding to sequence number "111" and multiplexers 210 and gates 215-216 process the data word and generate a processed data word for latch 220 by selection of bits from the data word, these operations all occurring as indicated during the period indicated by numeral 303.

At the beginning of the next cycle, the processed word is presented to the output of latch 220 so that DAC 80, at a time period indicated by numeral 305, is strobed by signal 150 to load this processed word if DAC 80 is selected by the appropriate bit from memory 102. At the end of the period indicated by numeral 305, DAC 80 has loaded the processed word and has about 0.9 microsecond to convert this word to an analog signal on the corresponding conductor 54. Also at the beginning of this "next cycle", sequence number "000" is presented to memory 101. As a result and as indicated by numeral 306, the next processed word, which is for DAC 81, is generated during the same cycle the previous processed word is being loaded by DAC 80. This word for DAC 81 will be loaded thereby, as indicated by numeral 307, while a new processed word is being generated for DAC 82 as indicated by numeral 308.

This overlapping of loading a DAC while generating a processed word by bit selection for the next DAC to be strobed by a signal 152-157 continues until, at times indicated by numeral 310, DAC 86 is being loaded and input data for DAC 87 is being processed. At the end of period 310, the sequence the sequence number is advanced to "111",, so that gate 122 and 125 permit flip-flop 130 to accept a following strobe signal 73 from buffer 62 at a time period indicated by numeral 312 during which DAC 87 is loaded as indicated at numeral 314.

Since the one of the devices 10-17 has thus processed data from a word 42 and distributed the processed data to the DAC's 80-87 of the device during 0.9 microsecond, it will be apparent that the device is fully effective for processing telemetered data words 43 at a rate of one million per second.

Obviously, many modifications and variations of the present invention are possible in light of the above teachings. It is, therefore, to be understood that the invention may be practiced within the scope of the following claims other than as specifically described herein.

What is claimed is:

1. A telemetry word selector and processor for use with a telemetry system having:
    telemetered data for a plurality of parameters;
    a plurality of destinations to receive processed data for said parameters; and
    a succession of digital telemetered data words and a succession of digital tag words, wherein
        each data word is accompanied by a tag word;
        different data words may have data for different sets of said parameters, and
        said sets are distinguished by predetermined tags in said tag words,
    said word selector and processor comprising:
    means for receiving each of said data words and each of said tag words;
    destination selection memory means for storing a plurality of destination selection words, said memory means being addressed by the tag of a received tag word, and each of said selection words having a plurality of indicators individually corresponding to said destinations;
    means for loading said memory means with a set of said selection words for addressing by each tag of a predetermined set of said tags;
    processing means for generating said processed data from said telemetered data in a received data word; and
    destination control means for directing said processed data to a set of said destinations selected by said indicators of a destination selection word addressed in said memory means by said tag word accompanying said received data word, said destination control means having a plurality of destination control gate means for admitting said processed data to said destinations and for blocking sad processed data from said destinations, each of said gate means;
    corresponding to one of said destinations;
    receiving the indicator of said selection word corresponding to said one destination;
    receiving said processed data from said processing means;
    admitting said processed data to said one destination when said indicator is in one predetermined state; and
    blocking sad processed data from said one destination when said indicator is in another predetermined state.

2. A telemetry word selector and processor for use with a telemetry system having:
    telemetered data for a plurality of parameters;
    a plurality of destinations to receive processed data for said parameters, each of said destinations being receptive to a processed data word having predetermined first bit positions; and
    a succession of digital telemetered data words and a succession of digital tag words, wherein
        each data word is accompanied by a tag word and,
        different data words may have data for different sets of said parameters, and
        said sets are distinguished by predetermined tags in said tag words,
    said word selector and processor comprising:
    means for receiving each of said data words and each of said tag words;
    destination selection memory means for storing a plurality of destination selection words, said memory means being addressed by the tag of a received tag word, and each of said selection words having a plurality of indicators individually corresponding to said destinations;

means for loading said memory means with a set of said selection words for addressing by each tag of a predetermined set of said tags;

processing means for generating said processed data from said telemetered data in a received data word, said processing means having bit selection means for selecting a bit at any one of sad second bit positions as a bit at any one of said first bit positions, and for setting a bit at any one of said first bit positions to a predetermined state; and destination control means for directing said processed data to a set of said destinations selected by said indicators of a destination selection word addressed in said memory means by said tag word accompanying said received data word.

3. The word selector and processor of claim 2 wherein said bit selection means comprises:

bit determination memory means for storing a plurality of fields, each of said fields corresponding to one of said first bit positions and including an address identifying one of said second bit positions; and a plurality of multiplexer means for selecting bits at said second bit positions for the first bit positions, each of said multiplexer means corresponding to one of said first bit positions and receiving the bits at said second bit positions, receiving from said bit determination memory means said address in the one of said fields corresponding to said one of the first bit positions, and providing a selected bit from the one of said second bit positions identified by said address.

4. The word selector and processor of claim 3 wherein each of said fields includes a control bit and wherein said processing means further comprises a plurality of bit control gate means for processing said selected bit from each of said multiplexer means, each of said gate means:

corresponding to one of said first bit positions;

receiving said selected bit provided by the one of said multiplexer means corresponding to said one bit position;

receiving from said bit determination memory means said control bit in the one of said fields corresponding to said one of the first bit positions;

combining said selected bit and said control bit in accordance with a predetermined gate function to generate a processed bit; and providing said processed bit to said destination control means as the bit at said one of said first bit positions.

5. A telemetry word selector and processor for use with:

a data destination receptive to a digital processed word having predetermined first bit positions;

a succession of digital telemetered data words each having predetermined second bit positions; and a plurality of test projects wherein there may be an arbitrary selection of bits at said second bit positions for said first bit positions and there may be an arbitrary setting to a predetermined state of bits selected for said first bit positions, said word selector and processor comprising:

means for receiving each of said telemetered data words;

bit determination memory means for storing a bit determination word having a plurality of fields, each of said fields corresponding to one of said first bit positions, including an address identifying one of said second bit positions, and including a control bit;

means for loading said memory means with said determination word providing for one of said test projects a predetermined said arbitrary selection and a predetermined said arbitrary setting;

a plurality of multiplexer means for selecting bits at the second bit positions for the first bit positions, each of said multiplexer means corresponding to one of said first bit positions, receiving the bits at said second bit positions, receiving from said memory means said address in the one of said fields corresponding to said one of the first bit positions, and providing a bit having said arbitrary selection from the one of said second bit positions identified by said address;

a plurality of bit control gate means for processing said selected bit from each of said multiplexer means, each of said gate means corresponding to one of said first bit positions, receiving said selected bit provided by the one of the multiplexer means corresponding to said one bit position, receiving from said memory means said control bit in the one of said fields corresponding to said one of the first bit positions, and combining said selected bit and said control bit in accordance with a predetermined gate function to generate a processed bit having said arbitrary setting; and distribution means for providing said processed bit generated by each of said gate means to said destination as the bit at the one of said first bit positions to which the gate means corresponds.

6. The word selector and processor of claim 5 wherein:

said data destination is one of a plurality of data destinations, each of said destinations being receptive to said processed word having said first bit positions, and corresponding to one of a plurality of predetermined sequence numbers;

said bit determination word is one of a plurality of bit determination words stored in said bit determination memory means, each of said determination words corresponding to one of said destinations, being addressable in said memory means by the one of said sequence numbers corresponding to said one of said destinations, and having said plurality of said fields and each field having said address and said control bit; and said means for loading said bit determination memory means loads said memory means with said plurality of determination words;

said distribution means includes latch means for retaining said processed word, said latch means receiving said processed bit from each of said gate means, and when a predetermined latch signal occurs, retaining said processed bit in said processed word at the one of said first bit positions thereof to which the gate means corresponds, and wherein said word selector and processor further comprises:

means for providing said sequence numbers in succession to said memory means as an address for said bit determination words, means for generating a plurality of destination selection signals, each of said selection signals corresponding to one of said destinations, and being generated when the one of said sequence numbers corresponding to said one of the destinations is generated, and means for generating said latch signal as each of said sequence numbers is generated; and a plurality of destination selection gate means for directing a processed word retained by said latch means to said destinations, each of said selection gate means corresponding to one of said destinations, receiving the one of said selection signals corresponding to said one of the destinations, receiving the processed word retained by said latch means, and admitting said processed word to said one of said destinations when said one of said selection signals occurs, so that:

when each of said sequence numbers corresponding to one of said destinations is provided to said memory means, the bit determination word stored therein and corresponding to said one of said destinations is addressed in said memory means for reception of said address in each of said fields by said multiplexer means to perform said selection of bits from said second bit positions, and for reception of said control bit in each of said fields by each of said bit control gate means to perform said setting of bits for said first bit positions;

when said latch signal occurs, bits selected by said multiplexer means and set by said bit control gate means are received in said latch means as said processed word for said one of said destinations; and when said one of said selection signals occurs, said processed word is directed to said one of said destinations by the one of said destination selection gate means corresponding to said one of said destinations.

7. The telemetry word selector and processor of claim 6:

wherein each of said telemetered data words is accompanied by a digital tag identifying a set of said data destinations to receive said processed word;

wherein the selector and processor further comprises destination selection memory means for storing a plurality of destination selection words, said selection words being addressable in said selection memory means by said tag, and each of said selection words having a plurality of bits individually corresponding to said destinations, and means for loading said selection memory means with one of said selection words for addressing by a predetermined said tag; and wherein each of said destination selection gate means corresponding to one of said destinations receives the bit of said selection word corresponding to said one of said destinations when said selection memory means is addressed by said predetermined tag, admits said processed word received by said latch means to said one of said destinations when said bit is in one predetermined state and said one of said selection signals corresponding to said one of said destinations occurs, and blocks said processed word received by said latch means from said one of said destinations when said bit is in another predetermined state, so that only said destinations in a set thereof selected by said bits of one of said selection words addressed in said selection memory means by said predetermined tag receive said processed word.

8. A telemetry word selector and processor for use with:

a plurality of devices each receiving an analog signal:

a succession of asynchronously provided telemetry words, each of said telemetry words having a plurality of bit positions;

a succession of asynchronously provided tag words, each of said tag words corresponding to one of said telemetry words; and a strobe signal occurring when one of said telemetry words and the corresponding one of said tag words are provided, said word selector and processor comprising:

telemetry buffer means for receiving one of said telemetry words when said strobe signal occurs, said telemetry buffer means having said second number of bit positions;

tag buffer means for receiving the one of said tag words corresponding to said one telemetry word when said strobe signal occurs;

timing means initiated by said strobe signal for generating a plurality of sequence numbers, said sequence numbers being generated in succession, and each of said sequence numbers corresponding to one of said devices generating a plurality of converter selection signals, said converter selection signals being generated in succession, and each of said converter selection signals corresponding to one of said sequence numbers and being generated as said one of said sequence numbers is generated, and generating a latch signal as each of said sequence numbers is generated;

a plurality of digital-to-analog converters, each of said converters corresponding to one of said devices and generating analog signal for said one of said devices from a digital converter input word having having a plurality of bit positions;

corresponding to one of said sequence numbers and to one of said converter selection signals, and accepting a converter input word when a converter input signal occurs;

latch means for retaining a converter input word when said latch signal occurs, said latch means having a plurality of bit positions, and each of said bit positions of said latch means corresponding to one of said bit positions of a converter input word;

a plurality of multiplexer means for selecting from said telemetry buffer means a bit from any one of said bit positions thereof, each of said multiplexer means corresponding to one of said bit positions of said latch means and being receptive to a digital telemetry bit address identifying any one of said bit positions of said telemetry buffer means;

means for providing a bit corresponding to such a bit selected by each one of said multiplexer means to said latch means at the one of said bit positions thereof corresponding to the multiplexer means;

bit control random access memory means for storing a plurality of bit selection words, each of said bit selection words corresponding to one of said sequence numbers, being addressable by said one of said sequence numbers, and having a plurality of fields, and each of said fields corresponding to one of said multiplexer means and having a telemetry bit address therefor;

converter selection random access memory means for storing a plurality of converter selection words addressable by a tag word in said tag buffer means, each of said converter selection words having a plurality of converter selection bits, and each of said converter selection bits corresponding to one of said digital-to-analog converters and having a predetermined state when said one of said converters is to receive a converter input word; and a plurality of converter selection gate means for selecting a set of said digital-to-analog converters to receive a converter input word from said latch means, each of said gate means
corresponding to one of said converters,
receiving the one of said converter selection signals corresponding to said one of said converters,
receiving the one of said converter selection bits corresponding to said one of said converters from a converter selection word being addressed in said converter control memory means by such a tag word in said tag buffer means, and
generating said converter input signal for said one of said converters when said one converter selection signal occurs and when said one converter selection bit is in said predetermined state.

9. The telemetry word selector and processor of claim 8:
wherein each of said bit selection words, which is stored in said bit control memory means and addressed by one of said sequence numbers, has a plurality of determination bits, each of said determination bits corresponding to one of said bit positions of said latch means; and
wherein said means for providing a bit selected by each one of said multiplexer means to said latch means comprises a plurality of bit determination gates, each of said bit determination gates
corresponding to said one of said multiplexer means and to said one of said bit positions of said latch means,
receiving such a bit selected from said telemetry buffer means by said one of said multiplexer means,
receiving the one of said determination bits corresponding to said one of said bit positions of said latch means when said bit control memory means is addressed by one of said sequence numbers, and
providing for said one of said bit positions of said latch means an output bit determined by a predetermined gate function combining said bit selected from said telemetry buffer means and said one of said determination bits.

10. The telemetry word selector and processor of claim 9 wherein:
said bit positions of said latch means include a most significant bit position and a less significant bit position;
said gate function of the one of said gates corresponding to said less significant position is the AND function; and
said gate function of the one of said gates corresponding to said most significant position is the EXCLUSIVE OR function.

11. The telemetry word selector and processor of claim 8 wherein:
each of said tag words has a predetermined number of bit positions;
said converter selection memory means has a plurality of storage locations equal in number to the number of said tag words possible with said predetermined number of bit positions, each of said storage locations storing a possible one of said converter selection words; and
each of said storage locations is addressed by a corresponding one of such tag words possible with said predetermined number of bit positions.

12. The telemetry word selector and processor of claim 8:
wherein the selector and processor is for use with a plurality of test projects and in each of said projects there is a set of arbitrarily selectable and predetermined tag words, each tag word of said set
thereof identifying an arbitrarily selectable and predetermined set of said digital-to-analog converters,
said telemetry words have bits from which bits are to be derived for such converter input words for said set of said converters, and
each bit for each bit position of a converter input word for each converter of said set of converters is to be derived from a bit at an arbitrarily selectable and predetermined bit position of a telemetry word corresponding to the tag word identifying the converter;
wherein in the selector and processor:
said bit control memory means has a plurality of bit control storage locations, each of said bit control storage locations having one of said bit selection words and being individually addressed by said one of said sequence numbers when said one of said sequence numbers is generated by said timing means, and
said converter selection memory means has a plurality of converter selection storage locations, each of said converter selection storage locations having one converter selection word of said plurality of converter selection words and being individually addressed by one
of said tag words of said set thereof when said one of said tag words is received in the second buffer means; and
wherein the selector and processor further comprises:

means for loading each of said bit control storage locations, which is addressed by a sequence number corresponding to one of said converters of said set thereof, with a bit selection word wherein each of said fields thereof, which corresponds by way of one of said multiplexer means and one of said bit positions of said latch means to one of said bit positions of a converter input word received by said one of said converters, has a digital address selecting a predetermined bit position of a telemetry word having a bit from which is to be derived a bit at said one of said bit positions of a converter input word for said one of said converters; and means for loading each of said converter selection storage locations, which is addressed by a tag word of said set thereof, with a converter selection word wherein the converter selection bits corresponding to said set of said converters identified by the tag word are in said predetermined state.

* * * * *